United States Patent
Schlesener et al.

(10) Patent No.: US 7,424,006 B1
(45) Date of Patent: Sep. 9, 2008

(54) METHODS AND SYSTEMS FOR PRIORITIZED MESSAGE PROCESSING

(75) Inventors: Matthew C. Schlesener, Olathe, KS (US); Pallavur A. Sankaranaraynan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 921 days.

(21) Appl. No.: 10/827,177

(22) Filed: Apr. 19, 2004

(51) Int. Cl.
*H04L 12/66* (2006.01)
(52) U.S. Cl. .................. 370/352; 370/401; 370/465
(58) Field of Classification Search ............... None
See application file for complete search history.

(56) References Cited

U.S. PATENT DOCUMENTS

| | | | |
|---|---|---|---|
| 6,625,258 B1 * | 9/2003 | Ram et al. ............. | 379/88.13 |
| 2002/0167946 A1 * | 11/2002 | Gallant ................ | 370/389 |
| 2003/0076816 A1 * | 4/2003 | Naranjo et al. ........... | 370/352 |
| 2004/0109437 A1 * | 6/2004 | Tanimoto .............. | 370/352 |
| 2004/0148297 A1 * | 7/2004 | Park et al. .............. | 707/100 |

OTHER PUBLICATIONS

Schlesener, Matthew C., "Performance Evaluation of Telephony Routing over IP (TRIP)," submitted to the Department of Electrical Engineering and Computer Science and the Faculty of the Graduate School of the University of Kansas in partial fulfillment of the requirements for the degree of Master's of Science.

* cited by examiner

*Primary Examiner*—Chau T. Nguyen
*Assistant Examiner*—Kenneth R Hartmann, II

(57) ABSTRACT

A communication system comprising a call control system and a gateway coupled to the call control system and coupled to a first network node and a second network node. The gateway interworks first communications to a first transport type for the first network node and interworks second communications to a second transport type for the second network node. The gateway, responsive to a status change associated with the first network node, transfers a first update message to the call control system wherein the first update message indicates the status change associated the first network node and the first transport type. The call control system, responsive to receiving the first update message from the gateway, determines a first priority associated with the first update message based on the first transport type.

54 Claims, 5 Drawing Sheets

METHODS AND SYSTEMS FOR PRIORITIZED MESSAGE PROCESSING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to packet network technologies, and in particular, to methods and systems for prioritized message processing.

2. Description of the Prior Art

Packet based voice communication networks package and transmit voice communications based on packet protocols. Voice over Internet Protocol (VoIP) networks typify modern packet based voice communication networks. VoIP networks digitize, compress, and convert voice communications to IP packets. Specialized signaling protocols are then employed to set up and tear down VoIP calls. Specialized signaling is also utilized to locate users across the various VoIP networks. Session Initiation Protocol (SIP) is an example of a popular VoIP signaling protocol.

SIP provides advanced signaling and control to VoIP networks for initiating, managing, and terminating VoIP network sessions, or calls. A typical SIP enabled VoIP network includes user agents, proxy servers, and media gateways. User agents are the end users of a SIP network. User agents can be the origin or destination for a call over a VoIP network. Media gateways interwork communications for calls that either originate or terminate outside of a VoIP network. Proxy servers (also commonly referred to as media gateway controllers) provide registration, redirect, and location services implemented by registrar, redirect, and location server applications running on the proxy servers. In particular, registrar servers manage user agents assigned to their network domains. Redirect servers redirect SIP messages to their appropriate destinations and return location information in response to queries. Location servers share responsibility for knowing the location and status of each gateway.

Telephony Routing over Internet Protocol (TRIP) is a protocol established to effectuate messaging between location servers and gateways to keep track of the location and status of the gateways. TRIP does not run directly over IP—it must ride over a telephony protocol like SIP or H.323. IP does not provide the infrastructure (e.g. SIP proxy server and media gateway) nor the packet structure to provide what TRIP needs to do its very specific job (dynamic building of proxy server routing tables). In a SIP only network, location servers are not utilized; rather, the proxy server will use standard Domain Name Service (DNS) methods to determine where to forward call requests. In a TRIP enabled SIP network, the location server builds a dynamic routing table based on TRIP update messages transmitted from various media gateways and location servers. The location server then accesses the resulting TRIP routing table to determine where to forward and redirect call requests.

TRIP enabled location servers are often referred to as TRIP speakers. A scaled down version of TRIP called TRIP-lite can be implemented on gateways. TRIP-lite transmits messaging from a gateway to at least one location server advertising the available routes and prefixes accessible through that gateway. For example, a first TRIP-lite enabled gateway might advertise to a location server that it services the 913 area code of the public switched telephone network (PSTN), while a second TRIP-lite enabled gateway advertises to the location server that it services the 816 area code of the PSTN. Thus, when a call request indicating a PSTN area code of 913 arrives into the location server, the location server knows to route that call to the first TRIP-lite enabled gateway. Other attributes advertised by TRIP-lite enabled gateways include destination prefixes, capacity to each prefix destination, and utilization levels of each trunk group terminating at the gateway. TRIP-lite allows location servers to have real-time knowledge of available gateway resources.

Unfortunately, current VoIP network configurations do not provide media gateways that support access for multiple services such as asynchronous transfer mode (ATM), Frame Relay, Signaling System 7 (SS7), or Packt over SONET (PoS). For example, current SIP and TRIP enabled location servers do not take into account which services are supported by which media gateways when building network routing tables. Additionally, current TRIP-lite enabled media gateways do not inform location servers of the types of services accessible supported by the gateways.

SUMMARY OF THE INVENTION

An embodiment of the invention solves the above problems and other problems by providing a method of operating a communication system. The communication system comprises a call control system and a gateway. The gateway is coupled to the call control system and coupled to a first network node and a second network node. The gateway interworks first communications to a first transport type for the first network node and interworks second communications to a second transport type for the second network node.

The method comprises a first step of transferring a first update message from the gateway to the call control system responsive to a status change associated with the first network node wherein the first update message indicates the status change associated with the first network node and the first transport type. Another step comprises receiving the first update message from the gateway into the call control system. Another step comprises in the call control system, determining a first priority associated with the first update message based on the first transport type.

Advantageously, an embodiment of the invention provides for prioritizing update messages based on a transport type associated with the update message. Such an advantage allows for a network operator, such as a service provider, to offer varied levels of service to customers. For example, a service provider can offer a high level of service to an enterprise customer that has an enterprise node in communication with the communication network of the service provider. Prioritizing update messages based on transport types allows for efficient processing operations.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 1-3

Figure 1:
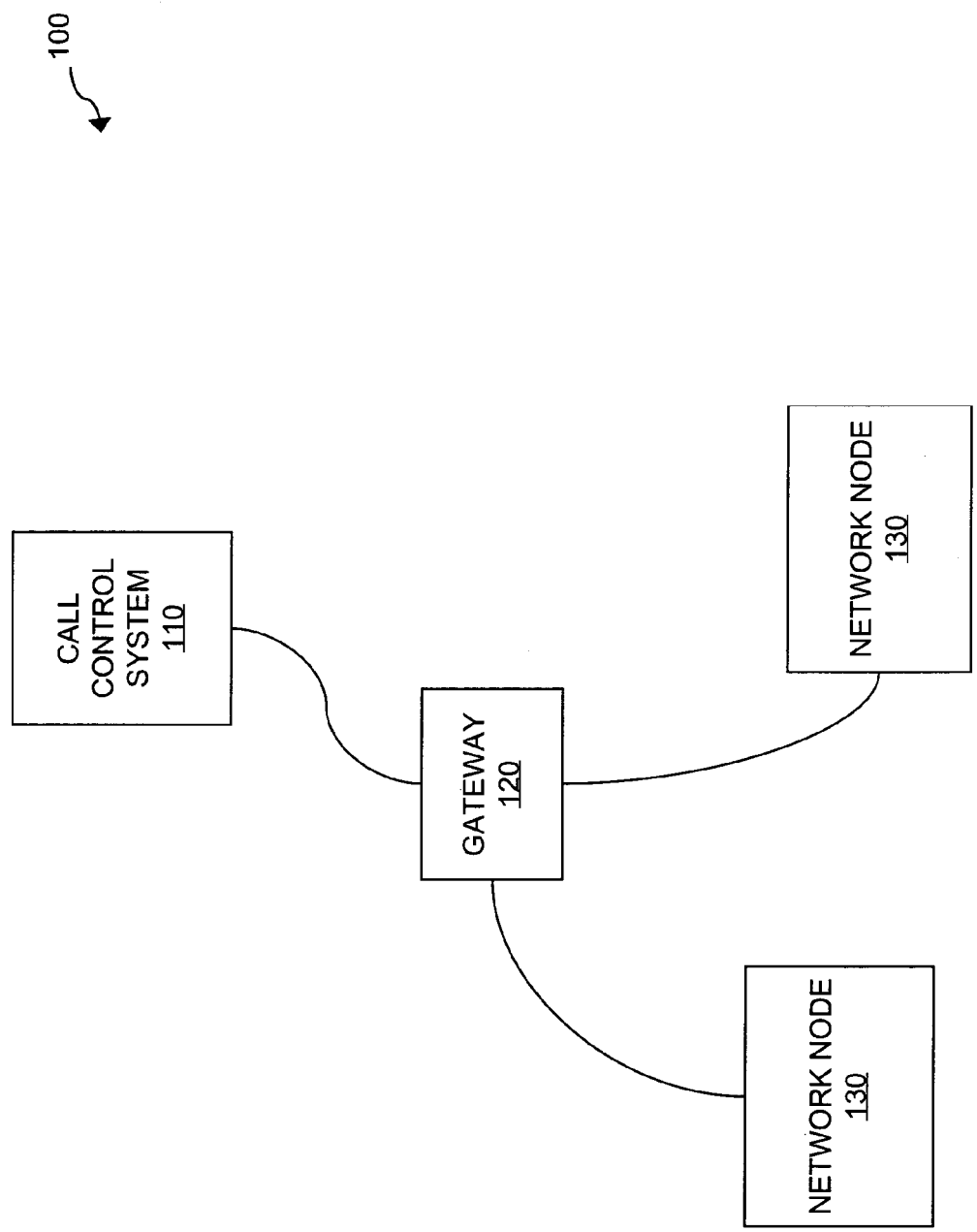
FIG. 1 illustrates a communication system in an embodiment of the invention.

FIG. 1 illustrates communication system 100 in an embodiment of the invention. Communication system 100 includes call control system 110, gateway 120, network node 131, and network node 132. Gateway 120 is coupled to call control system 110, network node 131, and network node 132.

Gateway 120 is any gateway capable of interworking communications to a first transport type for network node 131. Additionally, gateway 120 is any gateway capable of interworking communications to a second transport type for network node 132. Gateway 120 is also any gateway, responsive to a status change of network node 131, capable of transferring an update message to call control system 110.

Call control system 110 is any call control system capable of receiving an update message from gateway 120. Additionally, call control system 110 is any call control system capable of processing the update message to determine a priority associated with the update message.

Network node 131 is any network node capable of transferring and receiving communications to and from gateway 120 over a transport type. Similarly, network node 132 is any network node capable of transferring and receiving communications to and from gateway 120 over a transport type. A transport type is a format or protocol by which communications and messaging are transferred and received. For example, Internet protocol, asynchronous transfer mode (ATM), Frame Relay, and Packet over SONET (PoS) are examples of transport types.

Figure 2:
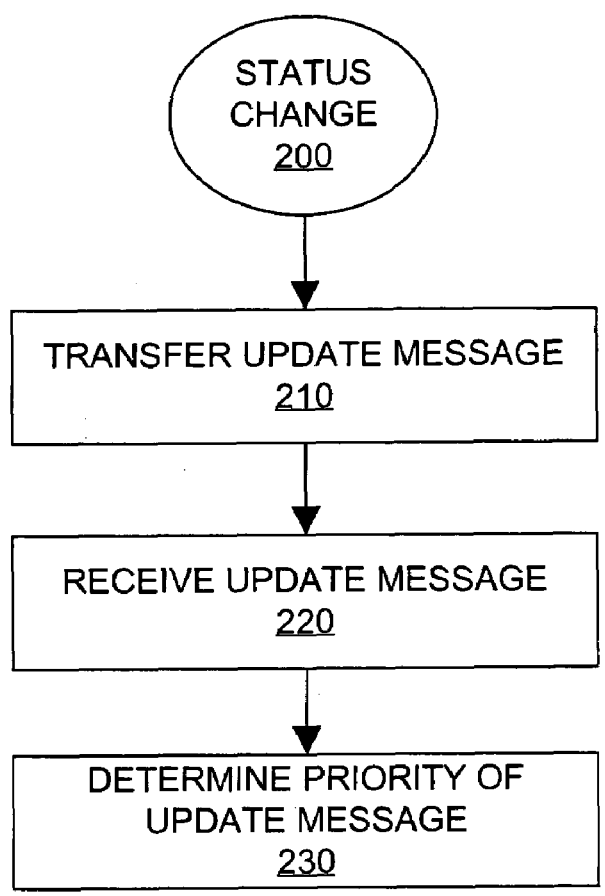
FIG. 2 illustrates the operation of an communication system in an embodiment of the invention.

FIG. 2 illustrates the operation of communication system 100 in an embodiment of the invention. To begin, a status change occurs with respect to a connection between gateway 120 and network node 131. For example, gateway 120 typically interworks communications to and from network node 131. Gateway 120 could go offline with respect to network node 131. Alternatively, gateway 120 could come online with respect to network node 131. In response gateway 120 transfers an update message to call control system 110 (Step 210).

Next, call control system 110 receives the update message. The update message indicates the status change associated with network node 131 and the type of transport to network node 131. Call control system 110 then determines a priority associated with the update message based on the type of transport to network node 131 (Step 230). For example, the transport type to network node 131 could be ATM. Thus, the call control system 110 could assign a particular priority to the update message based on a determination of the ATM transport type.

Figure 3:
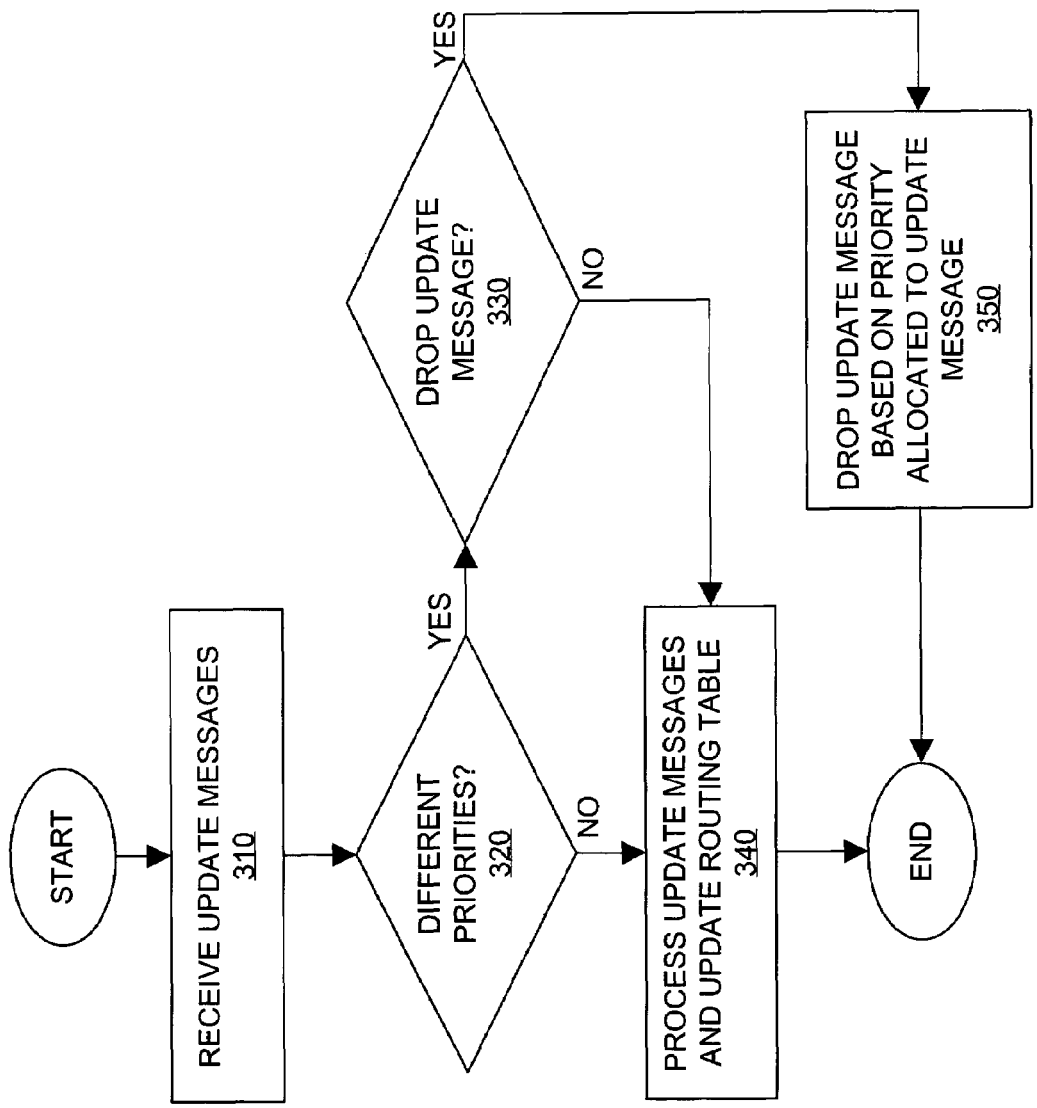
FIG. 3 illustrates the operation of an communication system in an embodiment of the invention.

FIG. 3 further illustrates the operation of communication system 100 in an embodiment of the invention. A status change could occur with respect to network node 132. In such a case, gateway 120 transfers another update message to call control system 110. Call control system 110 receives the message which indicates the status change associated with network node 132 and the type of transport to network node 132. Call control system them determines a priority associated with the update message based on the type of transport to network node 132.

Upon receiving both update messages and determining priorities for both update message, call control system 110 determines if the priorities for each update message differ (Step 310). If the priorities are the same, then call control system 110 processes the update messages to update a routing table (Step 340). The routing table holds data related to routes for routing communications. Call control system 110 updates the routing table by indicating the status change for any routes associated with gateway 120 and network nodes 131 and 132.

If the priorities assigned to the update messages differ, call control system 110 determines whether or not an update message should be dropped (Step 330). For example, if call control system 110 is in a period of message congestion, dropping some messages lessens the congestion. If a message should be dropped, call control system 110 drops one of the update messages based on their order of priority (Step 350). If messages need not be dropped, then call control system 110 processes the update messages to update a routing table (Step 340).

In an example of the invention, the transport type to network node 131 is ATM and the transport type to network node 132 is TDM. Call control system 110 could assign a higher priority to update messages with the ATM transport type and a lower priority to update messages with the TDM transport type. Thus, the update message from network node 132 would be dropped, and the update message from network node 131 retained and processed.

Second Embodiment Configuration and Operation

FIG. 4

Figure 4:
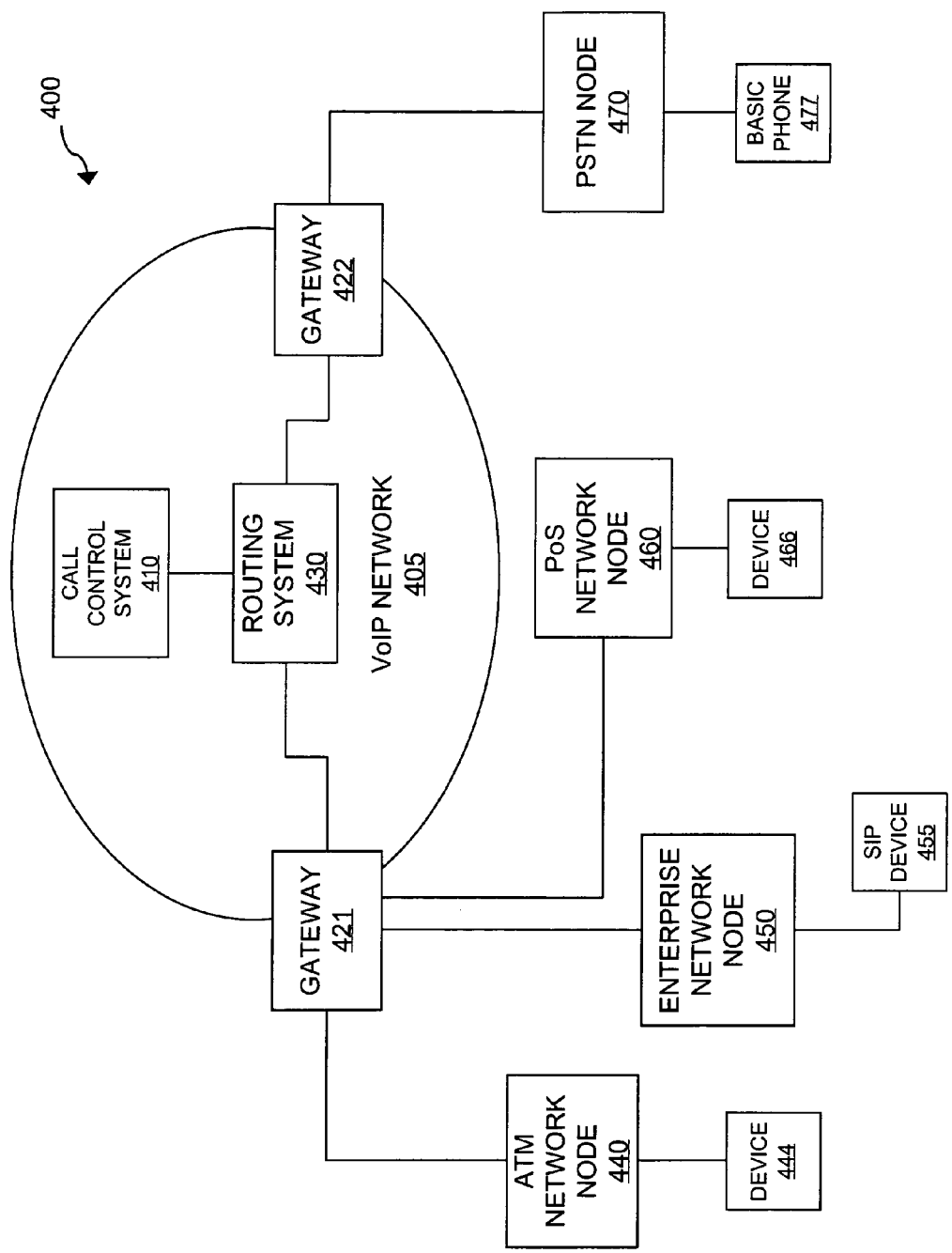
FIG. 4 illustrates a communication system in an embodiment of the invention.

FIG. 4 illustrates communication network 400 in an embodiment of the invention. Communication network 400 includes VoIP network 405, ATM network node 440, enterprise network node 450, PoS network node 460, and PSTN node 470. VoIP network 405 includes call control system 410, routing system 430, gateway 421, and gateway 422. VoIP network 405 is coupled to other networks by gateways 421 and 422. Gateway 421 couples VoIP network 405 to ATM network node 440, enterprise network node 450, and PoS network node 460. Gateway 422 couples VoIP network 405 to PSTN node 470. ATM network node 400 provides device 444 with access to VoIP network 405. Enterprise network node 450 provides SIP device 455 with access to VoIP network 405. PoS network node provides device 466 with access to VoIP network 405. PSTN node 470 provides phone 477 with access to VoIP network 405.

Call control system 410 is any call control system capable of receiving and processing update messages from gateways 421 and 422. Additionally, call control system 410 is any call control system capable of determining a priority associated with update messages received from gateways 421 and 422. Call control system 410 is also any call control system capable of updating a routing table based on update messages from gateways 421 and 422. Call control system 410 is commonly referred to by those skilled in the art as a media gateway controller. Call control system 410 is also commonly referred to by those skilled in the art as a soft switch.

Gateway 421 is any gateway capable of interworking communications between ATM network node 440, enterprise network node 450, and PoS network node 460 and VoIP network 405. Additionally, gateway 421 is any gateway capable of transferring update messages to call control system 410. Gateway 421 is commonly referred to in the art as a media gateway.

Gateway 422 is any gateway capable of interworking communications between PSTN network node 470 and VoIP network 405. Additionally, gateway 522 is any gateway capable of transferring update messages to call control system 410. Gateway 422 is commonly referred to in the art as a media gateway.

In an embodiment of the invention, call control system 410 could be a proxy server running an instance of a location server application. The location server running on call control system 410 could be SIP and TRIP enabled. TRIP enabled location servers are commonly referred to in the art as TRIP speakers. Similarly, gateways 421 and 422 could be TRIP-lite enabled gateways. Thus, the messaging that occurs between gateways 421 and 422 occurs in accordance with TRIP. The routing table updated by call control system 410 is a TRIP routing table.

Routing system 430 is any routing system capable of routing communications to and from gateways 421, 422, and call control system 410. In an embodiment of the invention, routing system 430 routes IP communications to and from gateways 421, 422, and call control system 410 in accordance with IP conventions and protocols. Routing system 430 includes various routing equipment and is depicted as a single entity for purposes of clarity. Routine system 430 could represent a single router or the Internet. Importantly, routing system 430 routes communications including update messages to and from gateways 421, 422, and 410.

ATM network node 440 is a node on an ATM network. The ATM network is not shown for purposes of clarity. Device 444 is a communication device connected to ATM network node 440. FIG. 4 depicts device 444 as directly connected to ATM network node 440, although one skilled in the art would understand that intermediate equipment would exist to connect device 444 to ATM network node 440. ATM network node 440 could be equipment such as an ATM switch or an ATM interworking unit.

Importantly, ATM network node 440 provides ATM service to customers using devices such as device 444, even if the communications do not originate from or arrive at the user device in the ATM format. For example, a long distance customer using a device such as device 444 could place a long distance call. The long distance call could be routed from local exchange carrier (LEC) equipment such as a central office to a long distance network such as an ATM network. Then, the call could be routed from a node on the ATM network such as ATM network node 440 to VoIP network 405. The transport type offered by ATM network node 440 is ATM. Thus, device 444 is connected to ATM network node 440 via a central office and a long distance network. Communications are transferred along the ATM network in the ATM format. Gateway 421 then converts or interworks the communications from ATM to a protocol suitable for VoIP network such as IP.

Enterprise network node 450 is a node on an enterprise network. The enterprise network is not shown for purposes of clarity. However, such a network could be a local area network (LAN), wide area network (WAN), or another, similar network. For example, enterprise network node 450 could be a node such as a firewall server on a corporate network, a university network, or another, similar network. Device 455 is a communication device connected to enterprise network node 450. FIG. 4 depicts device 455 as directly connected to enterprise network node 450, although one skilled in the art would understand that intermediate equipment might connect device 455 to enterprise network node 450.

Importantly, enterprise network node 450 provides enterprise service to customers using devices such as device 455. For example, device 455 could be a SIP enabled IP phone connected to enterprise network node 450. Device 455 could also be referred to as a SIP client, or a soft SIP client. A SIP phone is assigned an identifier (e.g. SIPuser@domain.com) and can receive incoming calls and place outgoing calls. In a basic SIP network, the proxy server can forward an incoming call request to the next proxy server along the path to the called phone. It also can provide information back to a caller to provide destination information so that the caller can reach the destination SIP phone directly. Enterprise node 450 therefore provides an enterprise transport for communications to device 455. Such a transport might be IP or some other packet based type of transport.

PoS network node 460 is a node on a PoS network. The PoS network is not shown for purposes of clarity. However, the PoS network could be PoS over a Metro Optical Network (PoS over MAN). Device 466 is a communication device connected to PoS network node 460. FIG. 4 depicts device 466 as directly connected to PoS network node 460, although one skilled in the art would understand that intermediate equipment might connect device 466 to PoS network node 460. PoS network node 460 could be equipment such as an add-drop-multiplexer (ADM) for a PoS MAN.

Importantly, PoS node 460 provides PoS services to customers using device such as device 466. PoS node 460 provides the PoS transport type. A transport type might also be referred to by those skilled in the art as a transport layer. For instance, PoS is a transport layer that runs on top of or above IP. Thus, gateway 421 converts or interworks communications from a transport layer for VoIP network 405 such as pure IP to a different transport layer for PoS node 460 such as PoS. Intermediary equipment might then convert the communications from PoS to another transport type or layer before the communications reach device 466.

PSTN node 470 is a node on the PSTN. The entire PSTN is not shown for purposes of clarity. PSTN node 470 could be, for example, a switch, a signal transfer point (STP), a tandem switch, a central office, or any other node on the PSTN. Phone 477 is a basic phone connected to the PSTN. For instance, phone 477 could be a standard phone connected to a local office by a TDM connection. Communications for a call placed from phone 477 reach gateway 422 in a TDM format. Gateway 422 then converts or interworks the communications from TDM to a protocol suitable for VoIP network 405 such as IP.

Gateway 422 also serves as a signaling conversion point for signaling from PSTN node 470. As known to those skilled in the art, the PSTN utilizes the SS7 signaling protocol. Gateway 422 is capable of interworking SS7 signaling to a protocol appropriate for VoIP network 405. Thus, the transport type associated with PSTN node 470 includes transports utilized by the PSTN such as TDM and SS7.

The following describes the operation of communication network 400 in an embodiment of the invention. As discussed above, call control system 410 is responsible for monitoring the status of various gateways within VoIP network 405. Specifically, call control system 410 keeps track of the status of gateways 421 and 422. Thus, when a caller using phone 477 places a call to a user using SIP device 455, call control system 410 is able to determine the best route for the call. However, while the call from phone 477 to SIP device 455 commences, many other calls and operations are occurring nearly simultaneously within and across VoIP network 405. The level of activity within and across VoIP network 405 impacts how quickly, efficiently, and accurately call control system 410 is able to process call requests, call forwarding requests, update messages, and all other types of messaging and activity.

Call control system 410 therefore employs SIP and TRIP for call control. For instance, call control system 410 runs an instance of a SIP and TRIP enabled location server for managing the operational aspects of gateways 421 and 422. When phone 477 initiates the call to SIP device 455, gateways 422 alerts call control system 410 of the requested call by way of a TRIP-lite message. Call control system 410 accesses a TRIP routing table to determine the appropriate outgoing gateway for the call. Upon determining that gateway 421 is the appropriate gateway for the call, call control system 410 transmits a reply control message to gateway 422 indicating that gateway 421 is the destination gateway for the call. Gateway 422 then interworks TDM communications for the call into IP communications and transmits the IP communications to gateway 421. Gateway 421 receives the IP communications and interworks the communications to an appropriate format for enterprise node 450. Enterprise node 450 then transfers the communications to SIP device 455.

In this example, call control system 410 determined that gateway 421 was the appropriate gateway for SIP device 455 because gateway 421 periodically updates call control system 410 as to the destination nodes and devices accessible through gateway 421. For instance, gateway 421 periodically transfers update messages to call control system 421 regarding the status of its connections to ATM node 440, enterprise node 450, and PoS node 460. Similarly, gateway 422 transmits update messages to call control system 410 to update call control system 410 on the status of its connections to PSTN node 470.

While FIG. 4 illustrates call control system 410 as coupled to only two gateways, call control system 410 could be coupled to many more gateways. In such a case, the volume and frequency of update messages received by call control system 410 could reach a level as to cause congestion within call control system 410. At such a time, call control system 410 must decide which update messages to drop and which to retain in order to clear the congestion caused by the high level of update message traffic. By prioritizing update messages based on the transport type associated with the various messages, call control system 410 is able to clear congestion without discarding some update messages that are more important than others.

A period of congestion could be caused, for example, by a situation wherein call control system 410 receives four update messages from gateways 421 and 422 combined. Gateway 421 first transfers an update message indicating that ATM node 440 has added capacity. Gateway 421 then transfers an update message indicating that enterprise node 450 now services SIP device 455. Lastly, gateway 421 transfers an update message indicating that PoS node 460 has gone offline. At the same time, gateway 522 transfers an update message indicating several new area codes of the PSTN accessible through gateway 422.

Call control system 410, receives all four update messages and assigns a priority to each update message. The update message regarding enterprise node 450 is assigned the highest priority. Next, the update message regarding ATM node 440 is assigned the second highest level of priority. The update message regarding PoS node 460 is assigned the third highest level of priority, and the update message regarding PSTN node 470 is assigned the lowest level of priority.

If call control system 410 is not in a period of congestion, the update messages are processed in the respective order they were received, and call control system 410 updates a TRIP routing table based on the content of the messages. However, if call control system is in a period of congestion, some of the messages must be dropped to relieve the congestion. Call control system 410 therefore drops the update message from gateway 422 regarding PSTN node 470. Next, call control system 410 would drop the update message regarding PoS node 460. If required, call control system 410 would drop the update message regarding ATM node 440 next. Lastly, if required, call control system 410 would drop the update message regarding enterprise node 450.

Call control system 410 determines the priority of update messages based on the transport type associated with the update message. Such a method provides a quick and efficient mechanism for clearing periods of congestions. Additionally, determining a priority based on a transport type effectively results in a system by which important network customers receive service commensurate with their importance. For example, an enterprise such as a large corporation may negotiate with the service provider of VoIP network 405 for a certain level of service. Rather than require call control system 410 to process each update message to determine the customer associated with the update message and then assign a high priority to the update message, call control system 410 simply assigns a high priority to the update message due to the fact that it is associated with an enterprise node such as enterprise node 450.

Similarly, update message associated with transport types for the PSTN might receive a lower level of treatment than an update message associated with an enterprise transport. In the middle, update messages associated with ATM or PoS transport types might receive a priority higher than the PSTN transport type, but lower than the enterprise transport type. Such treatment might be in accordance with an agreement with the operator of an ATM network or PoS network. Again, rather than process each update message to determine an operator associated with a node, each update message is quickly and efficiently assigned a priority based upon the transport type. In contrast, determining an operator associated with each update message would be processor intensive and inefficient.

Figure 5:
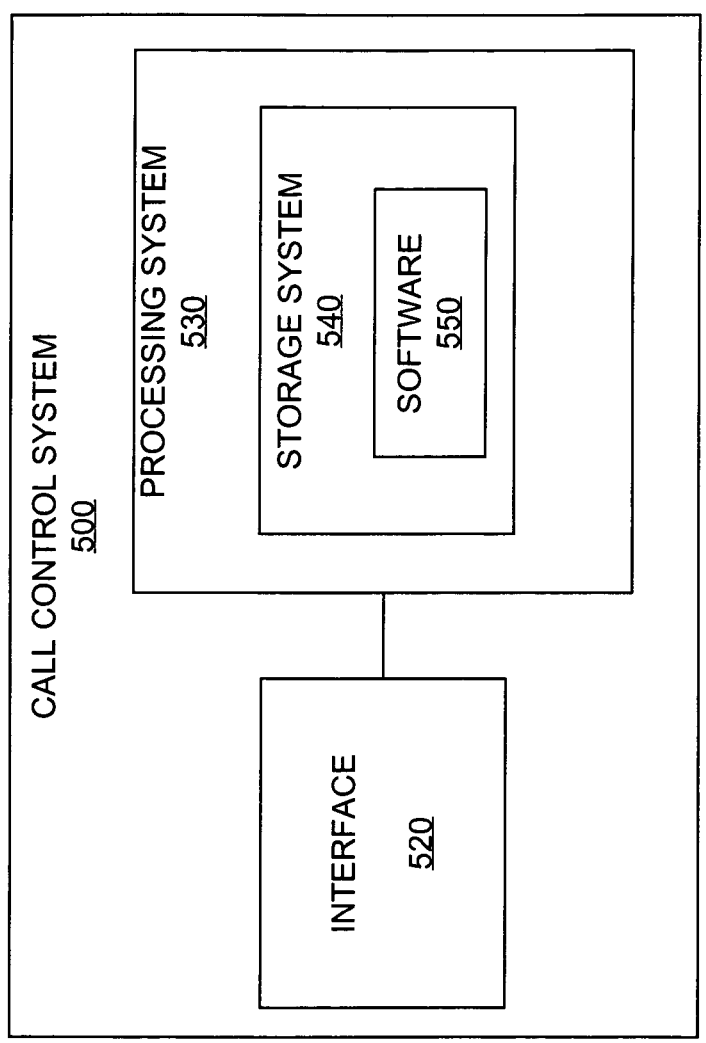
FIG. 5 illustrates a computer system in an embodiment of the invention.

Computer System—FIG. 5

FIG. 5 illustrates computer system 500 in an embodiment of the invention. Computer system 500 includes interface 520, processing system 530, storage system 540, and software 550. Storage system 540 stores software 550. Processing system 530 is linked to interface 520. Computer system 500 could be comprised of a programmed general-purpose computer, although those skilled in the art will appreciate that programmable or special purpose circuitry and equipment may be used. Computer system 500 may use a client server architecture where operations are distributed among a server system and client devices that together comprise elements 520-550.

Interface 520 could comprise a network interface card, modem, port, or some other communication device. Signaling interface 520 may be distributed among multiple communication devices. Interface 530 could comprise a computer microprocessor, logic circuit, or some other processing device. Processing system 530 may be distributed among multiple processing devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a general-purpose computer. Software 550 could also comprise an application program, firmware, or some other form of machine-readable processing instructions. When executed by the processing system 530, software 550 directs processing system 530 to operate as described for call control systems 110 and 410.

What is claimed is:

1. A communication system comprising:
   a call control system; and
   a gateway coupled to the call control system and coupled to a first network node and a second network node wherein the gateway interworks first communications to a first transport format for the first network node and interworks second communications to a second transport format for the second network node;
   the gateway, responsive to a status change associated with the first network node, transfers a first update message to the call control system wherein the first update message indicates the status change associated the first network node and the first transport format, and responsive to a status change associated with the second network node, transfers a second update message to the call control system wherein the second update message indicates the status change associated with the second network node and the second transport format;
   the call control system, responsive to receiving the first update message from the gateway, determines a first priority associated with the first update message based on the first transport format, responsive to receiving the second update message from the gateway, determines a second priority associated with the second update message based on the second transport format, and drops either the first update message or the second update message based on the first priority and the second priority.

2. The communication system of claim 1 wherein the call control system updates a routing table based on the second update message.

3. The communication system of claim 1 wherein the call control system updates a routing table based on the first update message.

4. The communication system of claim 3 wherein the routing table comprises a telephony routing over internet protocol (TRIP) routing table.

5. The communication system of claim 1 wherein the gateway interworks the first communications from internet protocol (IP) to the first transport format.

6. The communication system of claim 5 wherein the first transport format comprises asynchronous transfer mode (ATM).

7. The communication system of claim 5 wherein the first transport format comprises Frame Relay transport.

8. The communication system of claim 5 wherein the first transport format comprises Signaling System 7 (SS7).

9. The communication system of claim 5 wherein the first transport format comprises Packet over SONET (PoS).

10. The communication system of claim 5 wherein the first transport format comprises time division multiplexed (TDM).

11. The communication system of claim 5 wherein the gateway interworks the second communications from internet protocol (IP) to the second transport format.

12. The communication system of claim 11 wherein the second transport format comprises asynchronous transfer mode (ATM).

13. The communication system of claim 11 wherein the second transport format comprises Frame Relay transport.

14. The communication system of claim 11 wherein the second transport format comprises Signaling System 7 (SS7).

15. The communication system of claim 11 wherein the second transport format comprises Packet over SONET (PoS).

16. The communication system of claim 11 wherein the second transport format comprises time division multiplexed (TDM).

17. The communication system of claim 1 wherein the gateway comprises a telephony routing over internet protocol-lite (TRIP-lite) enabled gateway.

18. The communication system of claim 1 wherein the call control system comprises a telephony routing over internet protocol (TRIP) enabled location server.

19. A method of operating a communication system comprising a call control system and a gateway coupled to the call control system and coupled to a first network node and a second network node wherein the gateway interworks first communications to a first transport format for the first network node and interworks second communications to a second transport format for the second network node, the method comprising the steps of:
   transferring a first update message from the gateway to the call control system responsive to a status change associated with the first network node wherein the first update message indicates the status change associated with the first network node and the first transport format;
   transferring a second update message from the gateway to the call control system responsive to a status change associated with the second network node wherein the second update message indicates the status change associated with the second network node and the second transport format
   receiving the first update message from the gateway into the call control system;
   receiving the second update message from the gateway into the call control system;
   in the call control system, determining a first priority associated with the first update message based on the first transport format and determining a second priority associated with the second update message based on the second transport format; and
   dropping either the first update message or the second update message based on the first priority and the second priority.

20. The method of claim 19 further comprising the step of updating a routing table based on the second update message.

21. The method of claim 19 wherein the call control system updating a routing table based on the first update message.

22. The method of claim 21 wherein the routing table comprises a telephony routing over internet protocol (TRIP) routing table.

23. The method of claim 19 wherein the gateway interworks the first communications from internet protocol (IP) to the first transport format.

24. The method of claim 23 wherein the first transport format comprises asynchronous transfer mode (ATM).

25. The method of claim 23 wherein the first transport format comprises Frame Relay transport.

26. The method of claim 23 wherein the first transport format comprises Signaling System 7 (SS7).

27. The method of claim 23 wherein the first transport format comprises Packet over SONET (PoS).

28. The method of claim 23 wherein the first transport format comprises time division multiplexed (TDM).

29. The method of claim 23 wherein the gateway interworks the second communications from internet protocol (IP) to the second transport format.

30. The method of claim 29 wherein the second transport format comprises asynchronous transfer mode (ATM).

31. The method of claim 29 wherein the second transport format comprises Frame Relay transport.

32. The method of claim 29 wherein the second transport format comprises Signaling System 7 (SS7).

33. The method of claim 29 wherein the second transport format comprises Packet over SONET (PoS).

34. The method of claim 29 wherein the second transport format comprises time division multiplexed (TDM).

35. The method of claim 19 wherein the gateway comprises a telephony routing over internet protocol-lite (TRIP-lite) enabled gateway.

36. The method of claim 19 wherein the call control system comprises a telephony routing over internet protocol (TRIP) enabled location server.

37. A call control system comprising:
an interface configured to receive a first update message from a gateway wherein the first update message indicates a status change of a first network node and a first transport format and receive a second update message from the gateway wherein the second update message indicates a status change of a second network node and a second transport format wherein the gateway is coupled to the call control system and coupled to the first network node and the second network node and wherein the gateway interworks first communications to the first transport format for the first network node and interworks second communications to the second transport format for the second network node; and
a processing system configured to process the first update message to determine a first priority associated with the first update message based on the first transport format, process the second update message to determine a second priority associated with the second update message based on the second transport format, and determine to drop either the first update message or the second update message based on the first priority and the second priority.

38. The call control system of claim 37 wherein the call control system updates a routing table based on the second update message.

39. The call control system of claim 37 wherein the call control system updates a routing table based on the first update message.

40. The call control system of claim 39 wherein the routing table comprises a telephony routing over internet protocol (TRIP) routing table.

41. The call control system of claim 37 wherein the gateway interworks the first communications from internet protocol (IP) to the first transport format.

42. The call control system of claim 41 wherein the first transport type format comprises asynchronous transfer mode (ATM).

43. The call control system of claim 41 wherein the first transport format comprises Frame Relay transport.

44. The call control system of claim 41 wherein the first transport format comprises Signaling System 7 (SS7).

45. The call control system of claim 41 wherein the first transport format comprises Packet over SONET (PoS).

46. The call control system of claim 41 wherein the first transport format comprises time division multiplexed (TDM).

47. The call control system of claim 41 wherein the gateway interworks the second communications from internet protocol (IP) to the second transport format.

48. The call control system of claim 47 wherein the second transport format comprises asynchronous transfer mode (ATM).

49. The call control system of claim 47 wherein the second transport format comprises Frame Relay transport.

50. The call control system of claim 47 wherein the second transport format comprises Signaling System 7 (SS7).

51. The call control system of claim 47 wherein the second transport format comprises Packet over SONET (PoS).

52. The call control system of claim 47 wherein the second transport format comprises time division multiplexed (TDM).

53. The call control system of claim 37 wherein the gateway comprises a telephony routing over internet protocol-lite (TRIP-lite) enabled gateway.

54. The call control system of claim 37 wherein the call control system comprises a telephony routing over internet protocol (TRIP) enabled location server.

* * * * *